United States Patent [19]

Hata et al.

[11] Patent Number: 5,140,690
[45] Date of Patent: Aug. 18, 1992

[54] LEAST-RECENTLY-USED CIRCUIT

[75] Inventors: Masayuki Hata; Akira Yamada, both of Itami, Japan

[73] Assignee: Mitsubishi Denki Kabushiki Kaisha, Japan

[21] Appl. No.: 759,643

[22] Filed: Sep. 12, 1991

Related U.S. Application Data

[63] Continuation of Ser. No. 360,195, Jun. 1, 1989, abandoned.

[30] Foreign Application Priority Data

Jun. 14, 1988 [JP] Japan .................. 63-147705

[51] Int. Cl.$^5$ .................. G06F 12/12; G06F 11/00
[52] U.S. Cl. .................. 395/575; 395/425;
364/DIG. 1; 364/238.4; 364/243; 364/243.4;
364/243.41; 364/246; 364/246.1; 364/246.11;
364/246.12; 364/259; 364/259.1; 364/264;
364/264.1; 364/264.5; 364/265; 364/265.3;
364/266.5; 364/267; 364/267.2; 364/267.3;
364/267.6
[58] Field of Search .......... 364/200, 900, DIG. 1, 364/DIG. 2; 395/425, 575

[56] References Cited

U.S. PATENT DOCUMENTS

| | | | |
|---|---|---|---|
| 3,958,228 | 5/1976 | Coombes et al. | 364/200 |
| 4,008,460 | 2/1977 | Bryant et al. | 364/200 |
| 4,055,851 | 10/1977 | Jenkins et al. | 364/200 |
| 4,181,937 | 1/1980 | Hattori et al. | 364/200 |
| 4,322,795 | 3/1982 | Lange et al. | 364/200 |
| 4,334,289 | 6/1982 | Lange et al. | 364/900 |
| 4,349,875 | 9/1982 | Tada | 364/200 |
| 4,361,878 | 11/1982 | Lane et al. | 364/900 |
| 4,458,310 | 7/1984 | Chang | 364/200 |
| 4,507,729 | 3/1985 | Takahashi et al. | 364/200 |
| 4,511,994 | 4/1985 | Webb et al. | 364/900 |
| 4,905,139 | 2/1990 | Asai et al. | 364/200 |
| 4,912,712 | 3/1990 | Yamada | 371/57.2 |

FOREIGN PATENT DOCUMENTS 56-51430 12/1981 Japan .

OTHER PUBLICATIONS

"Clipper" Module Product Description, pp. 32–47, 1985, Fairchild.

*Primary Examiner*—Gareth D. Shaw
*Assistant Examiner*—Matthew C. Fagan
*Attorney, Agent, or Firm*—Townsend and Townsend

[57] ABSTRACT

A least-recently-used (LRU) circuit determines a replaceable term needed for storing data newly loaded from cache memory for example. The circuit comprises a recently-used information storing means relating to the top priority order or the subordinative order among plural terms, and a least-recently-used determining means for determining which is the top priority term or the subordinative term in accordance with information stored in the recently-used information storing means. High speed processing is thus possible by simplified logical construction. Also, the circuit is provided with control means which directly or indirectly select the predetermined replaceable term, in situations where the determining means cannot properly determine the top-priority replaceable term. Therefore, even when the top-priority replaceable term is selected directly or indirectly, the cache memory can be securely prevented from discontinuing its own functional operation.

13 Claims, 7 Drawing Sheets

LEAST-RECENTLY-USED CIRCUIT

This is a continuation of application Ser. No. 07/360,195, filed Jun. 1, 1989, now abandoned.

BACKGROUND OF THE INVENTION

1. Field of the Invention

The present invention relates to a least-recently-used (LRU) circuit which is used for identifying the priority order of data or data-storage areas to be replaced when storing those data newly loaded from main memory into a cache memory of a computer system. More particularly, the present invention relates to a least-recently-used circuit which allows cache memory to smoothly function even when the presence of an error may inhibit the priority order from correctly being identified.

2. Description of the Prior Art

A wide variety of computer systems extensively use cache memory for saving time in accessing memory. Cache memories store frequently accessible data from the main memory. In this case, controller system does not access the main memory first, but it accesses the cache memory. When accessible data is stored in the cache memory, the controller system directly accesses the accessible cache-hit data from the cache memory. Conversely, if no accessible data is stored in the cache memory, the controller system then transfers the accessible data from the main memory to the cache memory so that accessible data can be newly loaded to offset cache miss. Conventionally, the least-recently-used (LRU) algorithm, i.e., those data newly loaded from main memory, is stored in cache memory by replacing those data which were used in the furthest past.

FIG. 1 is the simplified block diagram of an LRU circuit when replacing data in the 4-bank set associative cache memory by applying the LRU algorithm cited above.

In the drawing, reference numeral 4 indicates four banks to be selected by the LRU control circuit 3, the LRU circuit 1 containing the LRU control circuit 3, which is a means for determining the replaceable object or renewing information in accordance with the content of LRU bit memory means 2 which is means for storing the recently-used relationship among these four banks.

Operation of the LRU circuit is described below.

When CPU (not shown) accesses the cache memory for reading data and then cache memory is hit by one of those four banks, the LRU circuit 1 transfers the content of LRU bit memory means 2 to the LRU control circuit 3 in order to renew memory content of LRU bit memory means 2, i.e., information representing which one of those four banks was accessed in the furthest past. Then, the LRU control circuit 3 renews the above information before allowing the renewed information to be written into LRU bit memory means 2.

On the other hand, if any cache miss occurs, the cache memory reads the accessible data delivered from the main memory (not shown) and internally loads it. The accessible data is then transferred to the data processor such as the CPU, and then, the cache memory stores this data. The LRU algorithm is used for determining which one of those four banks should store the new data, i.e., it determines replaceable data in any of those four banks. Concretely, when LRU circuit 1 transfers the content stored in LRU bit memory means 2 to the LRU control circuit 3, the LRU control circuit 3 selects any of these four replaceable banks in accordance with the LRU algorithm before storing those data newly read out of main memory into the selected bank. Simultaneously, the LRU control circuit 3 renews the content of data stored in the LRU bit memory means 2 and allows it to store the renewed content.

One example of the LRU control circuit using such an LRU algorithm is disclosed in the U.S. patent application Ser. No. 646,870, filed Aug. 31, 1984 (now abandoned).

Above-mentioned invention comprises "a first directing means which receives an access signal from each cache memory of the first pair of memories to decide the least-recently-used one between them and outputs a first access signal corresponding to receiving the access signal, a second directing means which receives an access signal from each cache memory of the second pair of memories to decide the least-recently-used one between them and outputs a second access signal corresponding to receiving the access signal, and a third directing means which receives said first and second signals from said first and second directing means to decide the least-recently-used one between said first and second pair of cache memories." That is, the aforementioned invention uses a tree construction, which requires many logical elements and is complicated. Processing speed is lowered because the processing result is obtained by tracing through the tree structure branch by branch.

SUMMARY OF THE INVENTION

This invention is designed by considering the above-mentioned circumstances.

The primary object of this invention is to provide a least-recently-used (LRU) circuit whose construction of the logical circuit is simplified and which is able to process at high speed.

The second object of the invention is to provide an LRU circuit which prevents cache memory from stopping a data processing operation even when the LRU circuit cannot correctly determine the top priority order (under presence of software error for example).

The LRU circuit of this invention comprises a means for storing the recently-used information relating to the top priority order or the subordinative order among a plurality of terms, and a least-recently-used determining means for determining that which is the top priority term or the subordinate term in accordance with information stored in the means for storing recently-used information, so that high speed processing is possible by relatively simple logical construction. Also, the circuit is provided with a control means, which directly or indirectly selects the predetermined replaceable term, in the case where determining means cannot properly determine the top-priority replaceable term. Therefore, even when the top-priority replaceable term cannot properly be selected, the predetermined replaceable term is selected directly or indirectly, so that the cache memory can securely be prevented from discontinuing its own functional operation.

The above and further objects and features of the invention will more fully be apparent from the following detailed description with accompanying drawings.

DESCRIPTION OF THE PREFERRED EMBODIMENTS

Referring now more particularly to accompanying drawings, preferred embodiments of the LRU circuit related to the invention are described below.

Figure 1:
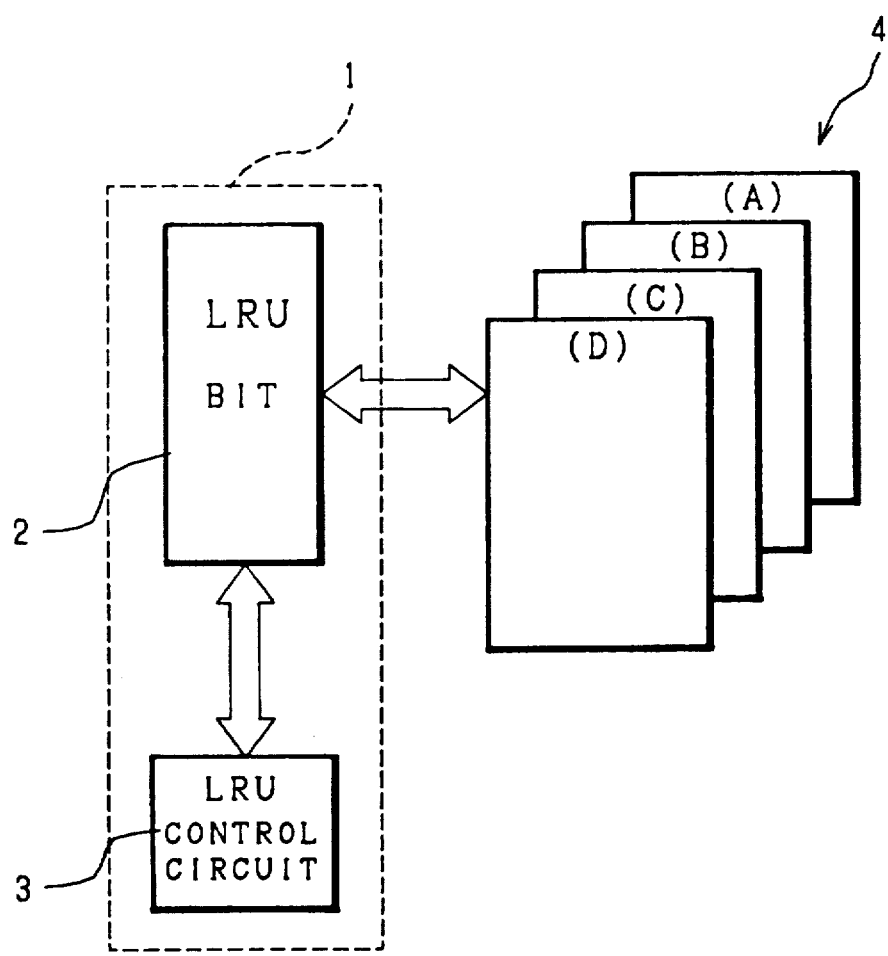
FIG. 1 is the simplified block diagram of four banks of four-bank associative cache memory and a least-recently-used (LRU) circuit.
Figure 2:
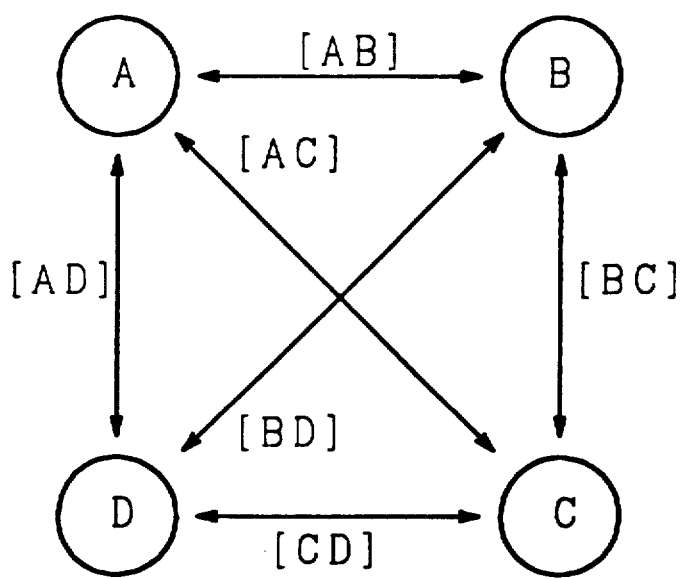
FIG. 2 is the simplified schematic diagram denoting a concept of selectable banks and memory content of an LRU bit for suggesting the priority relationship between these selectable banks.

FIG. 2 is the simplified schematic diagram denoting the concept of the data content stored in LRU bit memory means 2.

Figure 3:
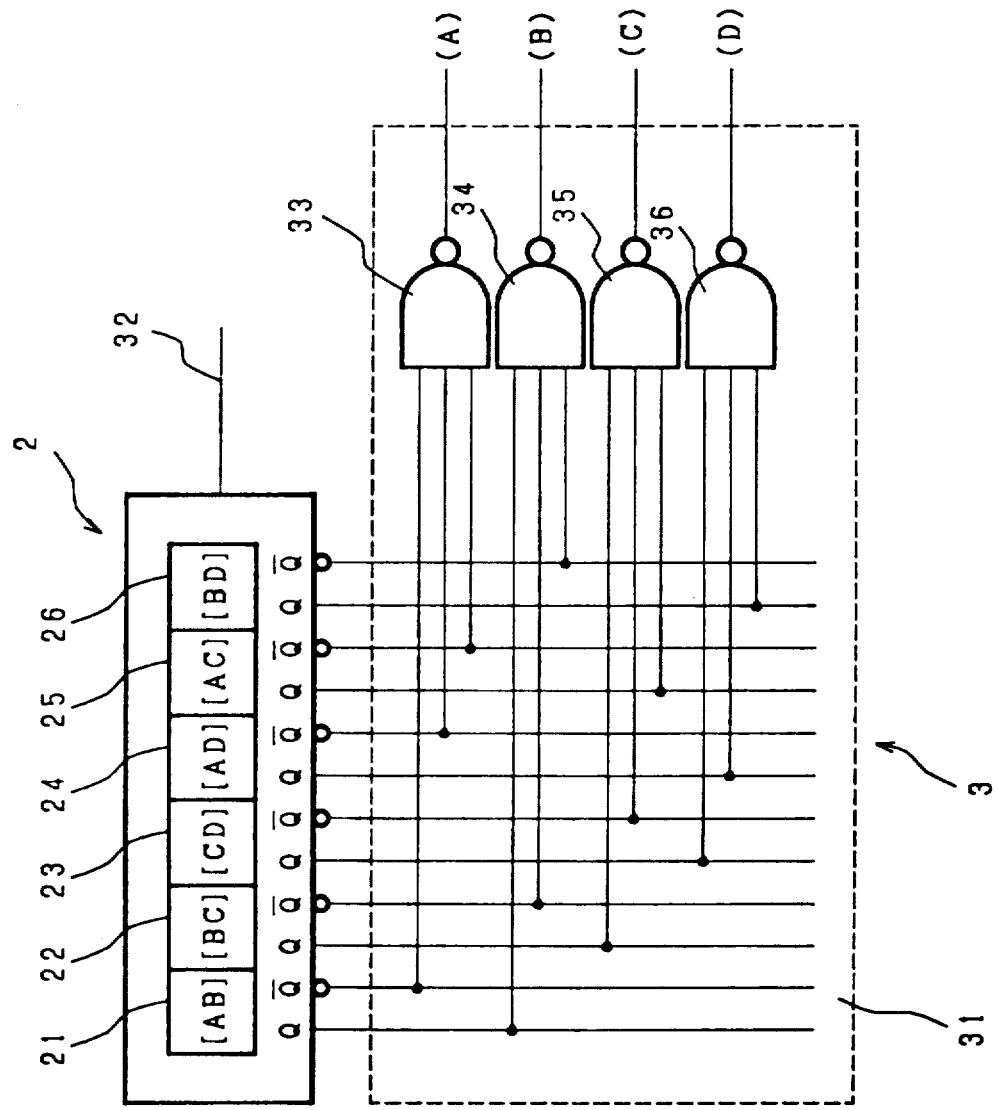
FIG. 3 is the block diagram of the first preferred embodiment of the LRU circuit related to the invention.

FIG. 3 is the simplified block diagram of the first embodiment of the LRU circuit of this invention which selects a replaceable bank from the content of the LRU bit memory means 2.

The following description refers to those preferred embodiments of the LRU circuit which is introduced to 4-bank associative cache memory.

Refer to FIG. 3, an LRU bit memory means 2 is means for storing recently-used (priority or subordinate) information, which is composed of six bits 21 through 26 for storing recently-used information among four banks A through D (not shown). Concretely, the bit 21 stores information denoting the recently-used relationship between the banks A and B. The bit 22 stores information denoting the recently-used relationship between the banks B and C. The bit 23 stores information denoting the recently-used relationship between the banks C and D. The bit 24 stores information denoting the recently-used relationship between the banks A and D. The bit 25 stores information denoting the recently-used relationship between the banks A and C. The bit 26 stores information denoting the recently-used (priority and subordinate) relationship between the banks B and D.

Each of these six bits is provided with a terminal Q which outputs high level signals when each bit is "1" and also a terminal $\overline{Q}$ which outputs high level signals when each bit is "0".

Reference numeral 31 is a selection circuit which is part of the LRU control circuit 3. Selection signal 32 activates the selection circuit 31 to select a replaceable bank after delivery of data content from the LRU bit memory banks 2. NAND gates 33 through 36 respectively decode signals outputted from the LRU bit memory means 2 and then output signals for selecting a replaceable bank. Concretely, the NAND gates 33 through 36 output signals for selecting the first bank A, the second bank B, the third bank C, and the fourth bank D, respectively.

More particularly, three input terminals of the NAND gate 33 are respectively connected to the terminal $\overline{Q}$ of the bit 21 which denotes the recently-used relationship between the banks A and B, the terminal $\overline{Q}$ of the bit 24 which denotes the recently-used relationship between the banks A and D, and the terminal $\overline{Q}$ of the bit 25 which denotes the recently-used relationship between the banks A and C. Likewise, three input terminals of the NAND gate 34 are respectively connected to the terminal Q of bit 21 which denotes the recently-used relationship between the banks A and B, the terminal $\overline{Q}$ of the bit 22 which denotes the recently-used relationship between the banks B and C, and the terminal $\overline{Q}$ of the bit 26 which denotes the recently-used relationship between the banks B and D.

Three input terminals of the NAND gate 35 are connected to the terminal Q of the bit 22 denoting the recently-used relationship between the banks B and C, the terminal $\overline{Q}$ of the bit 23 denoting the recently-used relationship between the banks C and D, and the terminal Q of the bit 25 denoting the recently-used relationship between the banks A and C respectively. Three input terminals of the NAND gate 36 are connected to the terminal Q of the bit 23 denoting the recently-used relationship between the banks C and D, the terminal Q of the bit 24 denoting the recently-used and relationship between the banks A and D, and the terminal Q of the bit 26 denoting the recently-used relationship between the banks B and D, respectively.

One of these four banks has the top priority over the rest, which means that that particular bank has the priority over any other bank. In other words, if the first bank A holds the priority over the second bank B, the third bank C, and the fourth bank D, then the first bank A holds the top priority over three others. Concretely, the cache memory can identify which one of these four banks holds the top priority by checking the condition of the LRU bit memory means 2 which stores the information pertaining to the recently-used relationship among these four banks.

For example, the LRU bit memory means 2 representing the recently-used (top priority or subordinate) relationship between the first bank A and the second bank B is denoted by an expression [A B]. Assume that the first bank A holds the high priority when [A B]="0" and the second bank B holds the high priority when [A B]="1". In addition, assume that "X" may be either "1" or "0". Then, if the content of LRU bit memory means 2 is denoted by those expressions shown below, the first bank A is provided with the top priority.

$[A B] = 0 \quad [B C] = X \quad [C D] = X$
$[A D] = 0 \quad [A C] = 0 \quad [B D] = X$ Likewise, if the following condition is present, then, the second bank B is provided with the top priority.

$[A B] = 1 \quad [B C] = 0 \quad [C D] = X$
$[A D] = X \quad [A C] = X \quad [B D] = 0$ Likewise, if the following condition is present, then, the third bank C is provided with the top priority.

$$[A\ B] = X \quad [B\ C] = 1 \quad [C\ D] = 0$$
$$[A\ D] = X \quad [A\ C] = 1 \quad [B\ D] = X$$

Likewise, if the following condition is present, then, the fourth bank D is provided with the top priority.

$$[A\ B] = X \quad [B\ C] = X \quad [C\ D] = 1$$
$$[A\ D] = 1 \quad [A\ C] = X \quad [B\ D] = 1$$

FIG. 3 denotes the bank selection circuit 31 which connects terminals Q and Q of each bit of LRU bit memory means 2 to each input terminal of the NAND gates 33 through 36 for implementing the above logic. The NAND gates 33 through 36 respectively output low-active signals. When the NAND gate 33 outputs signal "0", then, the first bank A is selected as replaceable object with the top priority. When the NAND gate 34 outputs signal "0", then, the second bank B is selected as replaceable object with the top priority. Likewise, when the NAND gate 35 outputs signal "0", then, the third bank C is selected as replaceable object with the top priority. In the same way, when the NAND gate 36 outputs signal "0", then, the fourth bank D is selected as replaceable object with the top priority.

Whenever the data replacing process is activated, the selection signal 32 goes high, thus allowing the memory contents of the bits 21 through 26 of the LRU bit memory means 2 to be delivered to the selection circuit 31. Normally, when this process is underway, any of those four banks A through D is ready for selection, and thus, any of NAND gates 33 through 36 outputs low level signal, whereas signals outputted from other three gates go high. This allows the selection circuit 31 to properly select any of those four banks A through D corresponding to any of the NAND gates 33 through 36 whose output signal turns to low level so that replacement of the designated bank can be implemented.

However, if any failure like software error is present in data-processing operation, any above-mentioned first embodiment of the least-recently-used circuit having the above constitution may not be able to correctly determine the replaceable bank.

For example, there are 24 sequential orders applicable to these four banks, which can be denoted by an expression $_4P_4 = 24$. Nevertheless, actually, there are 64 combinations in conjunction with binary signal status ("1" or "0"), which can be constituted by applying the LRU bit memory means 2 as denoted by an expression $2^6 = 64$.

Consequently, it is probable that as many as 48 kinds of conditions may also be generated by software error in addition to 24 kinds of sequential orders actually being present. If any of these incorrect conditions is present, any conventional LRU circuit cannot correctly determine the replaceable bank having the top priority. This may easily cause the cache memory to totally stop the data processing operation.

An explanation will be given on the second through fifth embodiments for avoiding the above-mentioned problems.

Figure 4:
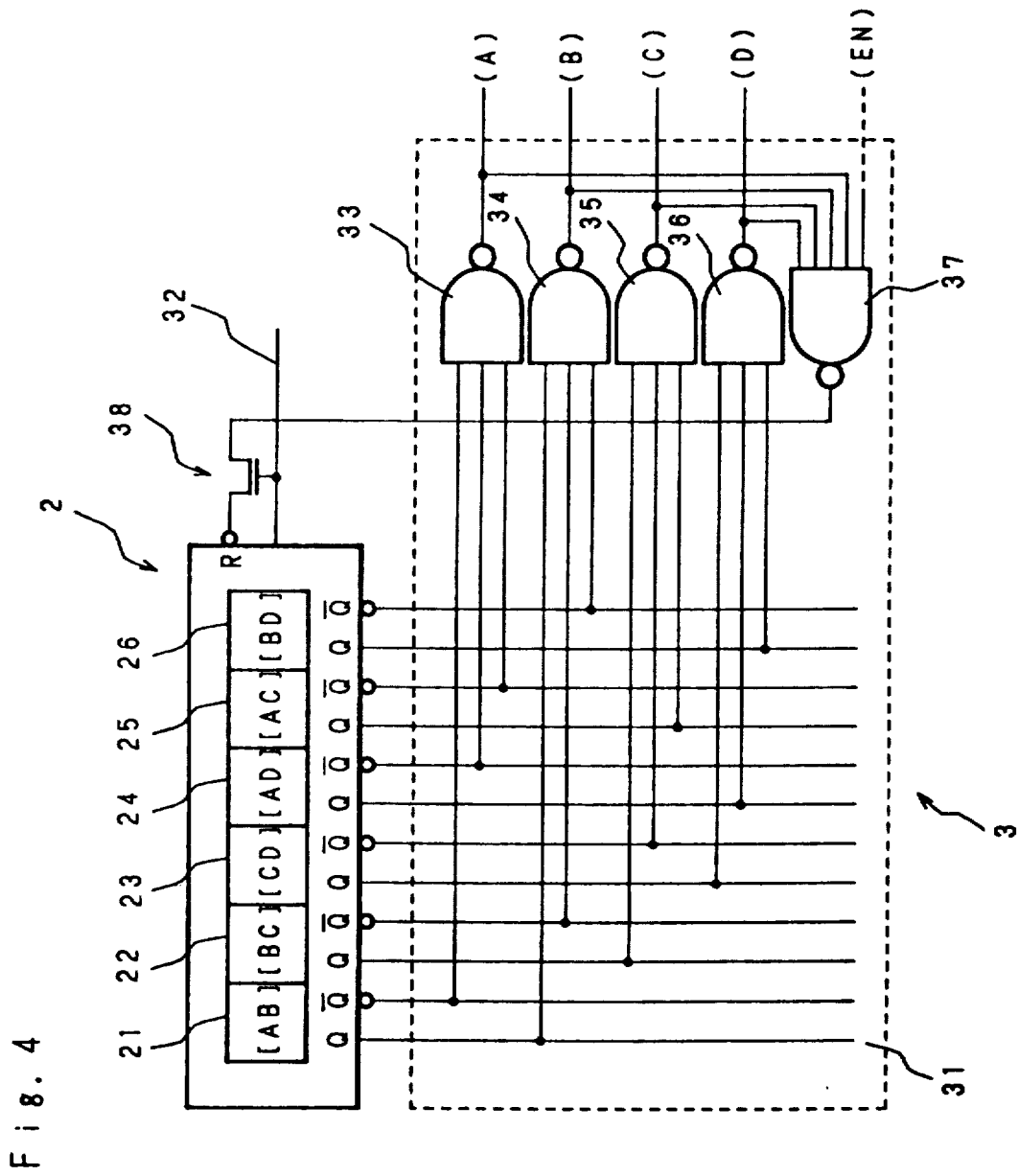
FIG. 4 is the block diagram of the second preferred embodiment of the LRU circuit related to the invention.

FIG. 4 is the block diagram of the second preferred embodiment of the LRU circuit related to the invention.

Those elements employed for constituting the second preferred embodiment are provided with specific reference numerals and characters identical to those of the above first preferred embodiment cited above.

In the second embodiment of this invention, a detection circuit 37 and a transmission gate 38 are added to the construction of the first preferred embodiment. In addition, reference character EN designates the enable signal for enabling operation of detection circuit 37.

The detection circuit 37 incorporating an NAND gate detects the condition when the NAND gates 33 through 36 output high level signals respectively. In other words, it detects the condition when any of the replaceable bank cannot be selected, and then, it outputs a low level signal. The signal output from the detection circuit 37 is delivered to the reset terminal R of the LRU bit memory means 2 through the transmission gate 38. Concretely, when the signal output from the detection circuit 37 goes low, the reset signal is delivered to the low-active reset terminal R of the LRU bit memory means 2 through the transmission gate 38.

Next, operation of the second preferred embodiment of the LRU circuit related to the invention is described below.

Whenever the data replacing process is activated, the selection signal 32 goes high, thus allowing the memory contents of the bits 21 through 26 of the LRU bit memory means 2 to be delivered to the selection circuit 31. Normally, when this process is underway, any of those four banks A through D is ready for selection, and thus, any of NAND gates 33 through 36 outputs low level signal, whereas signals output from the other three gates go high. This allows the selection circuit 31 to properly select any of those four banks A through D corresponding to any of the NAND gates 33 through 36 whose output signal turns to low level so that replacement of the designated bank can be implemented.

However, in the case that any of those four banks A through D cannot be selected by means of memory content of the bits 21 through 26 of the LRU bit memory means 2 due to software error being present, for example, if [A B]=0, [B C]=0, [C D]=0, [A D]=0, [A C]=1, and [B D]=0, then, all the signals outputted from the NAND gates 33 through 36 turn to high. This allows the detection circuit 37 to output a low level signal. When this process is underway, since the selection signal is high, the transmission gate 38 is activated to allow low signal from the detection circuit 37 to be delivered to the low-active reset terminal R of the LRU bit memory means 2 through the transmission gate 38. As a result, the bits 21 through 26 of the LRU bit memory means 2 are totally reset to "0". As soon as these bits 21 through 26 of the LRU bit memory means 2 are fully reset, only the signal output from the NAND gate 33 goes low, whereas all the signals from the NAND gates 34 through 36 go high. This allows the first bank A of these four banks to be selected. Simultaneously, signal outputted from the detection circuit 37 goes high so that the reset signal delivered to the LRU bit memory means 2 can eventually be released.

Basically, the detection circuit 37 may be composed of four-input NAND gate which receives signals from the NAND gates 33 through 36. Alternatively, the detection circuit 37 may also be constituted by applying a five-input NAND gate shown in FIG. 5 as the third preferred embodiment to allow the other input terminal to receive a control signal composed of either a masking signal or a timing signal for example.

In order to avoid complication of the circuit constitution, the above preferred embodiment introduces the system for resetting the bits 21 through 26 of the LRU bit memory means 2 by delivering a low level signal output from the detection circuit 37 to the reset terminal R of the LRU bit memory means 2. However, it is also possible for the above preferred embodiment to allow these bits 21 through 26 of the LRU bit memory means 2 to be set to "1" or any specific state as well.

Figure 5:
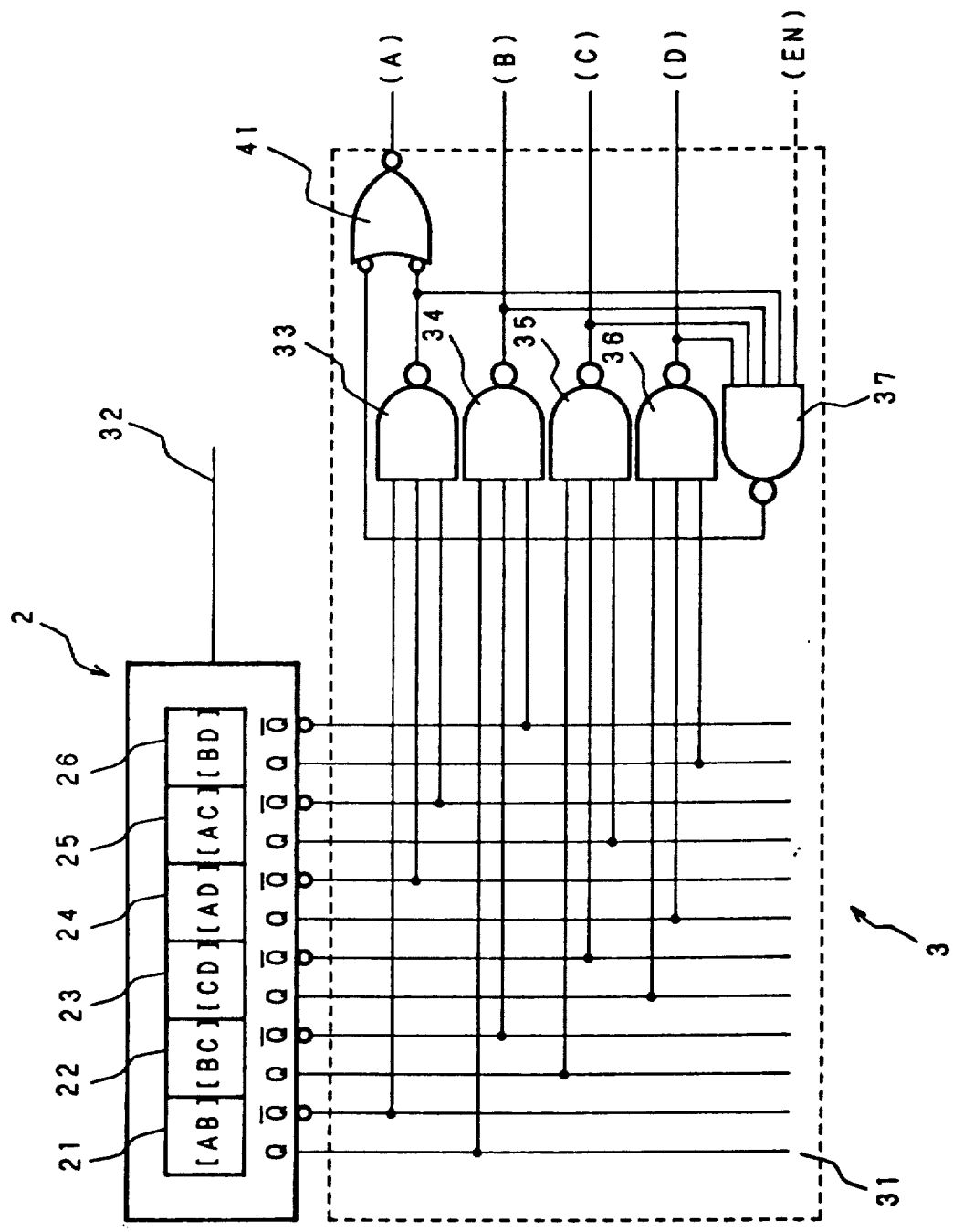
FIG. 5 is the block diagram of the third preferred embodiment of the LRU circuit related to the invention.

To implement the third preferred embodiment, another system may also be constituted, where any of those four banks A through D is directly and compulsorily selected by the signal output from the detection circuit 37. Concretely, a negated NOR signal of the signal from the detection circuit 37 and any of these NAND gates 33 through 36, signal from NAND gate 33 for example, as shown in FIG. 5, is received by the negated NOR gate 41. The negated NOR can be constructed as an AND gate. When this system is introduced, the transmission gate 38 is deleted.

Figure 6:
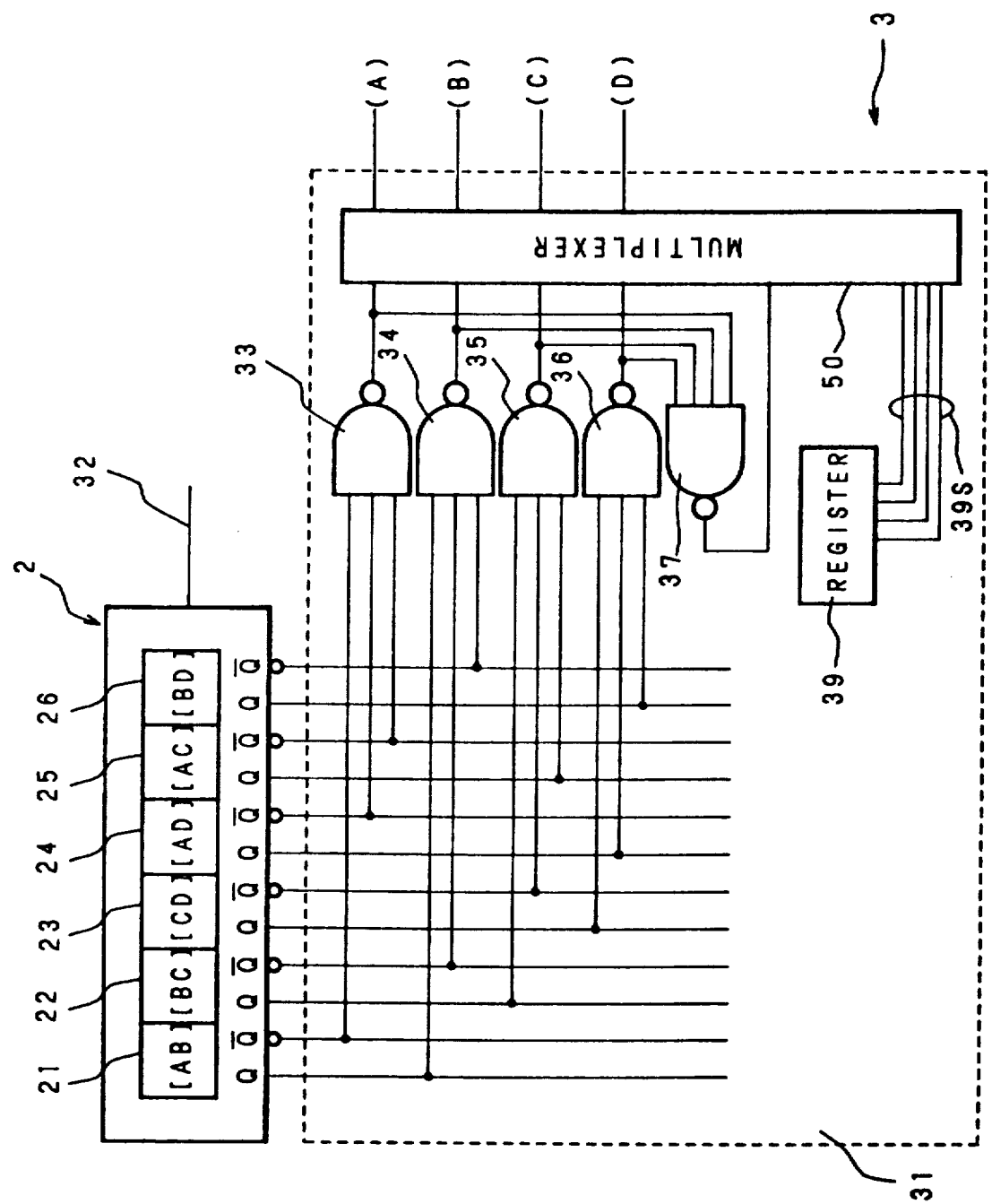
FIG. 6 is the block diagram of the fourth preferred embodiment of the LRU circuit related to the invention.

FIG. 6 is the schematic circuit diagram of the fourth preferred embodiment of the LRU circuit related to the invention. Those elements employed for constituting the fourth preferred embodiment are provided with specific reference numerals and characters identical to those of the above preferred embodiments cited above.

The LRU circuit related to the fourth preferred embodiment shown in FIG. 6 is provided with a multiplexer 50 having 8 input and 4 output terminals and 4-bit register 39.

The multiplexer 50 receives signal from the NAND gates 33 through 36 and the 4 bits of 4-bit register 39, via signal lines 39S respectively. In addition, the multiplexer 50 also receives control signals from the detection circuit 37. When the signal from the detection circuit 37 is high level, the multiplexer 50 outputs signals received from the NAND gates 33 through 36 via its own 4-bit output terminals. Conversely, when signal from the detection circuit 37 is low level, the multiplexer 50 outputs signals received from the 4-bit register 39 via own 4-bit output terminals. Consequently, even when the memory content of the LRU bit memory means 2 cannot select any of those four banks A through D, if specific data like the one composed of "0" from one bit and "1" from the rest of the 4-bit output were preliminarily set to the 4-bit register 39 by the software, those data stored in the 4-bit register 39 are output from the multiplexer 50 so that any of those four banks A through D can properly be chosen.

Figure 7:
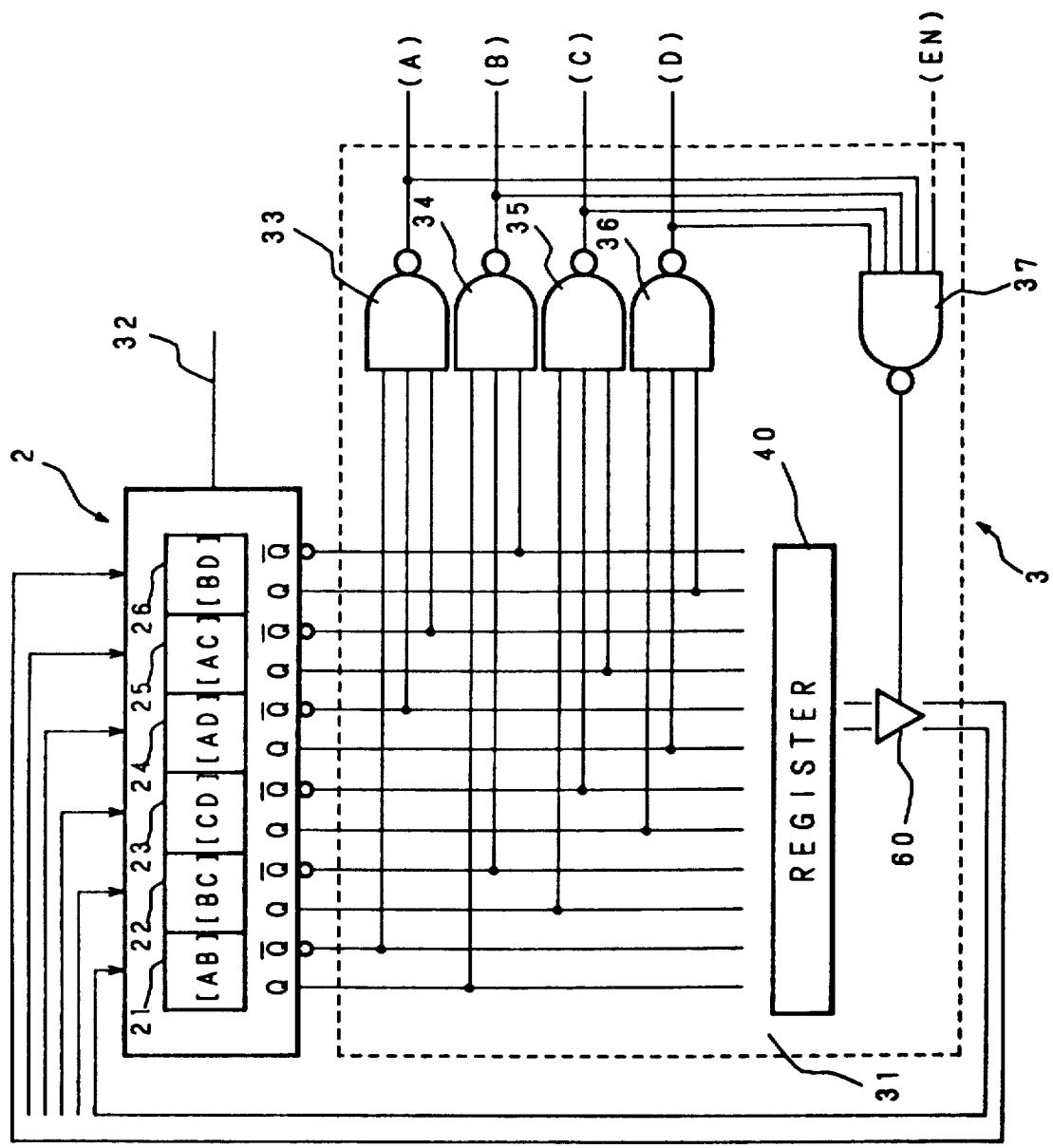
FIG. 7 is the block diagram of the fifth preferred embodiment of the LRU circuit related to the invention.

FIG. 7 is the schematic circuit diagram of the fifth preferred embodiment of the LRU circuit related to the invention. Those elements employed for constituting the fifth preferred embodiment are provided with specific reference numerals and characters identical to those of the preferred embodiments cited above.

The fifth preferred embodiment of the LRU circuit shown in FIG. 7 is provided with 6-bit register 40 and gate circuit 60 for transmitting signals from the 6-bit register 40 to the LRU bit memory means 2.

The gate circuit 60 receives control signals from the detection circuit 37. When signal from the detection circuit 37 is high level, the gate circuit 60 is inactivated. Conversely, when the signal from the detection circuit 37 is low level, the gate circuit 60 is activated to allow the 6-bit signals to be delivered from the 6-bit register 40 to the bits 21 through 26 of the LRU bit 2 before 6-bit data are compulsorily set.

Accordingly, even when the memory content of the LRU bit memory means 2 cannot properly select any of those four ways A through D, if specific data like the one composed of "0" from one bit and of "1" from the remaining three bits of the 4-bit output terminals are preliminarily set to the 6-bit register 40 by the software, then, 6-bit data stored in the 6-bit register 40 are delivered to the bits 21 through 26 of the LRU bit memory means 2 through the gate circuit 60 before being set. This allows the LRU circuit related to the invention to securely select any of those four banks A through D.

Those preferred embodiments described above represent the LRU circuit applicable to the 4-bank associative cache memory respectively. It should be understood, however, that the applicability of the invention is not merely defined to the 4-bank associative cache memory. It is needless to say that an identical effect can also be achieved by either increasing or decreasing the number of bits of the LRU bit memory means 2 and the number of NAND gates according to the number of banks.

As is clear from the above description, according to the LRU circuit embodied by the invention, high speed processing can be realized by simplified construction and even when any error is present in the information stored in the LRU bit, a designated replaceable bank can securely be selected. This totally prevents unwanted discontinuance of cache memory functional operation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A least-recently-used circuit for selecting a replaceable bank in a memory having n banks comprising:
 a least-recently-used memory having a series of bit storage cells, wherein each cell represents a relative order of priority as between two banks in said memory in accordance with a value of a bit stored within said each cell and wherein each cell has a Q and a not−Q output;
 a set of n means for outputting a control signal to select said replaceable bank, each of said n means consisting of a single NAND gate having an output and an input;
 a first one of said n means for outputting a control signal having said output of the first one of said n means coupled to a first bank and said input of the first one of said n means coupled to said not−Q output of select ones of said bit storage cells which represent a relative order of priority as between said first bank and remaining banks;
 an nth one of said n means for outputting a control signal having said output of the nth one of said n means coupled to an nth bank and said input of the nth one of said n means coupled to said Q output of select ones of said bit storage cells which represent a relative order of priority as between said nth bank and said first bank through n−1 banks;
 a kth one of said n means for outputting a control signal having said output of the kth one of said n means coupled to a kth bank and a first terminal of said input of the kth one of said n means coupled to said Q output of select ones of said bit storage cells which represent a relative order of priority as between said kth bank and first through k−1 banks and a second terminal of said input coupled to said not−Q output of select ones of said bit storage cells which represent a relative order of priority as between said kth bank and k+1 through nth banks, for 2≦k≦n−1;

means, having an input coupled to an enable signal and to said outputs of said n means for outputting a control signal, and having an output, for detecting an absence of said control signal; and a transistor gate having a first, second and third terminal, said first terminal coupled to a reset terminal of said least-recently-used memory, said second terminal coupled to a means for activating said least-recently-used circuit and said third terminal coupled to said output of said means for detecting said absence of said control signal, for resetting each bit stored in said bit storage cells when said control signal is absent and whereby to select said replaceable bank is selected.

2. A least-recently-used circuit for selecting a replaceable bank in a memory having n banks comprising:

a least-recently-used memory having a series of bit storage cells, wherein each cell represents a relative order of priority as between two banks in said memory in accordance with a value of a bit stored within said each cell and wherein each cell has a Q and a not−Q output;

a set of n means for outputting a first control signal to select said replaceable bank, each of said n means consisting of a single NAND gate and having an output and an input;

a first one of said n means for outputting a first control signal having said output of the first one of said n means coupled to a first bank and said input of the first one of said n means coupled to said not−Q output of select ones of said bit storage cells which represent a relative order of priority as between said first bank and remaining banks;

an nth one of said n means for outputting a first control signal having said output of the nth one of said n means coupled to an nth bank and said input of the nth one of said n means coupled to said Q output of select ones of said bit storage cells which represent a relative order of priority as between said nth bank and said first bank through n−1 banks;

a kth one of said n means for outputting a first control signal having said output of the kth one of said n means coupled to kth bank and a first terminal of said input of the kth one of said n means coupled to said Q output of select ones of said bit storage cells which represent a relative order of priority as between said kth bank and first through k−1 banks and a second terminal of said input coupled to said not−Q output of select ones of said bit storage cells which represent a relative order of priority as between said kth bank and k+1 through nth banks, for 2≦k≦n−1;

means, having an output and an input coupled to an enable signal and to said outputs of said n means for outputting a first control signal, for detecting an absence of said first control signal; and means, consisting of a negated NOR gate having an input connected to said output of said means for detecting an absence of said first control signal and to an output of one and only one of said n means for outputting a first control signal, and having an output coupled to a given bank, for outputting a second control signal to select said given bank as said replaceable bank when said means for detecting outputs a signal indicating said absence of said first control signal.

3. The least-recently-used circuit of claim 2 wherein said means for detecting an absence of said first control signal comprises a NAND gate.

4. The least-recently-used circuit of claim 2 wherein said negated NOR gate is constructed as an AND gate.

5. The least-recently-used circuit of claim 2 further comprising a means, coupled to said least-recently-used memory, for activating said least-recently-used circuit.

6. A least-recently-used circuit for selecting a replaceable bank in a memory having n banks comprising:

a least-recently-used memory having a series of bit storage cells, wherein each cell represents a relative order of priority as between two banks in said memory in accordance with a value of a bit stored within said each cell and wherein each cell has a Q and a not−Q output;

a set of n means for outputting a first control signal to select said replaceable bank, each of said n means having an output and an input;

a first one of said n means for outputting a first control signal having said output of the first one of said n means coupled to a first bank and said input of the first one of said n means coupled to said not−Q output of select ones of said bit storage cells which represent a relative order of priority as between said first bank and remaining banks;

an nth one of said n means for outputting a first control signal having said output of the nth one of said n means coupled to an nth bank and said input of the nth one of said n means coupled to said Q output of select ones of said bit storage cells which represent a relative order of priority as between said nth bank and said first bank through n−1 banks;

a kth one of said n means for outputting a first control signal having said output of the kth one of said n means coupled to a kth bank and a first terminal of said input of the kth one of said n means coupled to said Q output of select ones of said bit storage cells which represent a relative order of priority as between said kth bank and first through k−1 banks and a second terminal of said input coupled to said not−Q output of select ones of said bit storage cells which represent a relative order of priority as between said kth bank and k+1 through nth banks, for 2≦k≦n−1;

a register, which stores a given fixed second control signal, wherein said second control signal is independent of a previously asserted first control signal for selecting a predetermined replaceable bank;

means, having an output and having an input coupled to said outputs of said n means for outputting a first control signal, for detecting an absence of said first control signal; and a multiplexer, having an output coupled to said n banks and having an input coupled to said outputs of said n means for outputting a first control signal, to said register and to said output of said means for detecting, which outputs said first control signal when said output of said means for detecting is asserted and said multiplexer outputs said second control signal when said output of said means for detecting is deasserted.

7. The least-recently-used circuit of claim 6 wherein each of said n means for outputting a first control signal comprises a NAND gate.

8. The least-recently-used circuit of claim 6 wherein said means for detecting an absence of said first control signal comprises a NAND gate.

9. The least-recently-used circuit of claim 6 further comprising a means, coupled to said least-recently-used memory, for activating said least-recently-used circuit.

10. A least-recently-used circuit for selecting a replaceable bank in a memory having n banks comprising:
- a least-recently-used memory having a series of bit storage cells, wherein each cell represents a relative order of priority as between two banks in said memory in accordance with a value of a bit stored within said each cell and wherein each cell has a Q and a not−Q output;
- a set of n means for outputting a control signal to select said replaceable bank, each of said n means having an output and an input;
- a first one of said n means for outputting a control signal having said output of the first one of said n means coupled to a first bank and said input of the first one of said n means coupled to said not−Q output of select ones of said bit storage cells which represent a relative order of priority as between said first bank and remaining banks;
- an nth one of said n means for outputting a control signal having said output of the nth one of said n means coupled to an nth bank and said input of the nth one of said n means coupled to said Q output of select ones of said bit storage cells which represent a relative order of priority as between said nth bank and said first bank through n−1 banks;
- a kth one of said n means for outputting a control signal having said output of the kth one of said n means coupled to a kth bank and a first terminal of said input of the kth one of said n means coupled to said Q output of select ones of said bit storage cells which represent a relative order of priority as between said kth bank and first through k−1 banks and a second terminal of said input coupled to said not−Q output of select ones of said bit storage cells which represent a relative order of priority as between said kth bank and k+1 through nth banks, for $2 \leq k \leq n-1$;
- a gate, having an output coupled to said least-recently-used memory, an input and a gate enable;
- means, having an input coupled to an enable signal and to said outputs of said n means for outputting a control signal, and having an output coupled to said gate enable, for detecting an absence of said control signal and for enabling said gate when said absence is detected; and
- a register, coupled to said input of said gate memory, which outputs a fixed predetermined bit pattern to said bit storage cells of said least-recently-used memory to enable selection of a predetermined replaceable bank when said gate is enabled.

11. The least-recently-used circuit of claim 10 wherein each of said n means for outputting a control signal comprises a NAND gate.

12. The least-recently-used circuit of claim 10 wherein said means for detecting an absence of said control signal comprises a NAND gate.

13. The least-recently-used circuit of claim 10 further comprising a means, coupled to said least-recently-used memory, for activating said least-recently-used circuit.